June 24, 1941.　　　C. E. PHILLIPS　　　2,246,695
CONTAINER
Filed Oct. 18, 1937
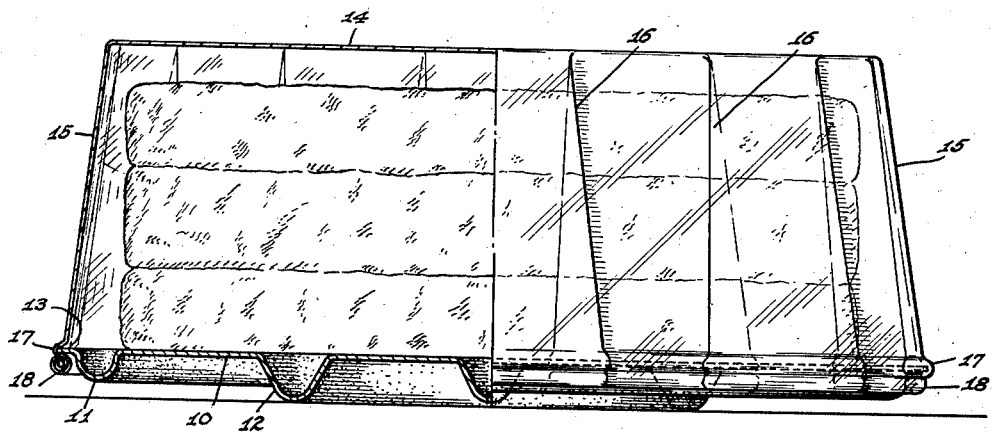
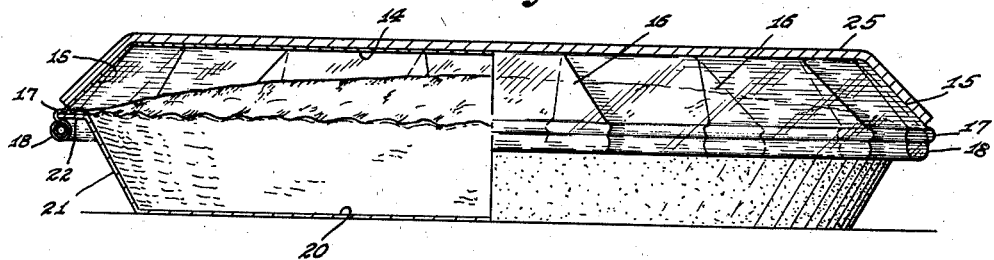
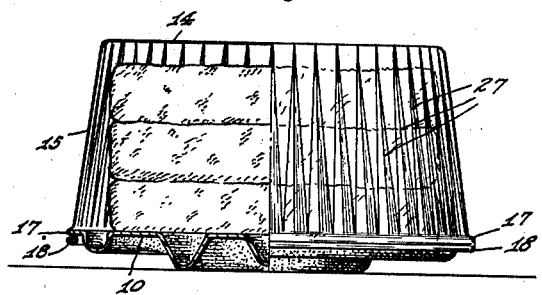
INVENTOR.
CHARLES E. PHILLIPS,
BY
ATTORNEYS.

Patented June 24, 1941

2,246,695

UNITED STATES PATENT OFFICE 2,246,695

CONTAINER

Charles E. Phillips, Indianapolis, Ind.

Application October 18, 1937, Serial No. 169,566

9 Claims. (Cl. 206—44)

It has heretofore been proposed to provide for cake, pies, and similar articles of food a cover, transparent in whole or in part, which would protect the food article from contamination and which at the same time would leave it visible. Covers of glass, which have been used to some extent, are objectionable because of their expense, relatively heavy weight, and fragile character. Covers of Celluloid, or of such a flexible transparent material as Cellophane, have been proposed; but such covers have been open to the objection that they either had to be made of relatively heavy material or else had to have associated with them a stiffening frame or other means for supporting them and holding them in place.

It is the object of my invention to produce a food container or support having a cover which, while self-supporting, can still be made of relatively thin and inexpensive material and through which the contents will be visible. A further object of my invention is to produce such a device in which the cover will be positively held in place so that it can not accidentally become dislodged. Still another object of my invention is to produce a cover which will fit tightly in association with the container or support so as to prevent contamination of the contained food.

In carrying out my invention, the container or support is formed with relation to the article of food with which it is to be used. For example, I may provide a more or less conventional form of dish, for containing a pie, or a flat plate, desirably formed with annular reinforcing ribs, for the support of a cake. Whatever the character of the container, it is formed with an annular rim or flange, desirably plane. The cover is formed of a sheet of flexible material and has a plane center portion and a circular side wall integral with the center portion and desirably frusto-conical in shape. Near its edge, the side wall is formed with an inwardly directed peripheral groove for receipt of the rim or flange on the container or support with which the cover is to be used; and the edge of the wall beyond such groove is formed into a reinforcing bead.

The accompanying drawing illustrates my invention: Fig. 1 is a side elevation of a cake plate provided with my improved cover, parts of the assembly being broken away and appearing in section; Fig. 2 is a view similar to Fig. 1, but illustrating a pie dish and an associated cover; and Fig. 3 is still another similar view showing a cake plate and an associated cover, the cover being of somewhat modified construction.

In the arrangement illustrated in Fig. 1, there is employed a generally plane, circular plate 10, desirably formed of pressed cardboard and provided with one or more annular reinforcing ribs. Two such ribs are shown in the drawing, a rib 11 near the periphery of the plate and a second rib 12 of materially smaller diameter. The rib 12 is deeper than the rib 11, and is the part of the plate which engages a supporting surface. In addition to its reinforcing function, the rib 11 also provides an upwardly opening annular groove adapted to receive crumbs which are formed upon the cutting of a cake supported upon the plate. Outwardly beyond the rib 11 lies the rim 13 of the plate, which as indicated above is desirably plane.

The cover illustrated in Fig. 1 is formed of flexible material, and has a plane center portion or top 14 and a downwardly extending circular side 15, desirably frusto-conical in shape. The nature of the material employed will vary with the character of cover desired. Thus, for a cover which is to be transparent throughout, Cellophane or some similar material may be employed. I do not limit myself to material of this type, however; as covers formed of paper are within the scope of my invention. If desired, a paper cover may have a portion rendered transparent by the application of suitable and well known substances to render the contents of the package visible, or the sheet from which the cover is formed may be a composite sheet made up of pieces of opaque material, such as paper, and transparent material, such as Cellophane.

The entire cover is formed of a disk or sheet of the selected material, any excess material created by the formation of the side wall 15 being folded into pleats 16. Near its lower edge, the side wall 15 is provided with an outwardly directed annular rib 17 which forms an inwardly opening annular groove adapted to receive the rim 13 of the plate; and below the rib 17, the edge of the side wall 15 is formed into a reinforcing bead 18. This bead may be formed by rolling the edge of the cover material spirally, as indicated in the drawing; and if so formed its several layers are preferably cemented or fused together to strengthen the bead and stiffen the cover. Additional stiffening of the cover may be obtained by similarly cementing or fusing the pleats 16 to the body of the side wall 15. However, especially if the cover is formed of thermoplastic material, it is not necessary that its edge be rolled spirally in forming the bead 18; as the edge of the cover may be thickened to form the bead merely by melting it in a suitable die.

The internal diameter of the bead 18 is made slightly less than the diameter of the plate-rim 13, so that it will have to be stretched when put in place on the plate. The preferred material (Cellophane or an equivalent) possesses such elasticity that the bead is not permanently deformed in stretching it to pass over the edge of the rim 13; and, when the cover is in place, the elasticity of the bead serves to hold the cover in association with the plate, with the rim 13 of the plate seated in the groove formed by the interior of the annular rib 17.

The pie container illustrated in Fig. 2 has a plane bottom 20 and an upwardly extending circular side wall 21 terminating in an outwardly directed plane rim 22, thus resembling a conventional pie tin. The cover illustrated in Fig. 2 is essentially the same as that of Fig. 1, except that it is of less depth. It is formed with a circular center portion 14, a frusto-conical side wall 15, a rib 17, and a bead 18 corresponding to the similarly numbered parts in Fig. 1. When in association with the pie container, the cover is held in place by the elasticity of the bead 18 which holds the rim 22 firmly seated in the groove within the rib 17.

To prevent distortion of the covers when they are being put in place, it may be advisable to support them during that operation in a cup of rigid material such as is indicated at 25 in Fig. 2. Such a cup conforms to the shape of the cover, engages both the plane central portion and the circular wall of the cover, and extends along such central wall to a point adjacent the rib 17. With such a device, any permanent deformation of the cover can be avoided as it is stretched while being put in place.

The modification of my invention illustrated in Fig. 3 is essentially the same as that illustrated in Fig. 1 except for the fact that excess material resulting from the formation of the circular side wall 15 is formed into pyramidal ribs or flutes 27 instead of being formed into the pleats 16. Such flutes add to the stiffness of the cover.

I claim as my invention:

1. A container, comprising the combination of a supporting member and a cover therefor, said member being circular and having a plane rim portion and within said rim portion a depressed portion adapted to rest on a supporting surface, said cover being formed from a sheet of flexible material having its edge portion folded into a downwardly extending frusto-conical side wall with the excess material created by such folding gathered into pleats, the material of said cover at the free edge of said wall being preformed into a peripheral bead having an internal diameter less than the diameter of said supporting member, and the side wall of said cover immediately above said bead being formed to provide an inwardly opening annular groove within which the edge of said supporting member is received, the depressed portion of said supporting member extending downwardly below said bead.

2. A container, comprising the combination of a supporting member and a cover therefor, said member being circular and having a plane rim portion and within said rim portion a depressed portion adapted to rest on a supporting surface, said cover being formed from a sheet of flexible material having its edge portion folded into a downwardly extending frusto-conical side wall, the material of said cover at the free edge of said wall being preformed into a peripheral bead having an internal diameter less than the diameter of said supporting member, and the side wall of said cover immediately above said bead being formed to provide an inwardly opening annular groove within which the edge of said supporting member is received, the depressed portion of said supporting member extending downwardly below said bead.

3. A container, comprising the combination of a supporting member and a cover therefor, said member being circular and having a plane rim portion and within said rim portion a depressed portion adapted to rest on a supporting surface, said cover being formed from a sheet of flexible material having its edge portion folded into a downwardly extending frusto-conical side wall, the material of said cover at the free edge of said wall being preformed into a peripheral bead having a normal internal diameter less than the diameter of said supporting member and possesses sufficient elasticity to permit it to be passed over the edge of said supporting member, the depressed portion of said supporting member extending downwardly below said bead when the cover is in place.

4. A container, comprising the combination of a supporting member and a cover therefor, said member being circular and having a plane rim portion and within said rim portion a depressed portion adapted to rest on a supporting surface, said cover being formed of flexible material and having a downwardly extending annular side wall, the material of said cover at the edge of said side wall being preformed into a peripheral bead having a normal internal diameter less than the diameter of said supporting member and possesses sufficient elasticity to permit it to be passed over the edge of said supporting member, the depressed portion of said supporting member extending downwardly below said bead when the cover is in place.

5. A container, comprising the combination of a supporting member and a cover therefor, said member being circular and having a plane rim portion and within said rim portion a depressed portion adapted to rest on a supporting surface, said cover being formed of flexible material and having a downwardly extending annular side wall, the material of said cover at the edge of said side wall being preformed into a peripheral bead having an internal diameter less than the diameter of said supporting member, and the side wall of said cover immediately above said bead being formed to provide an inwardly opening annular groove within which the edge of said supporting member is received, the depressed portion of said supporting member extending downwardly below said bead.

6. The invention set forth in claim 4 with the addition that the material of said cover is fusible, said bead comprising the fused edge portion of said cover.

7. A container, comprising the combination of a supporting member and a cover therefor, said member being circular and having a plane rim portion and within said rim portion a depressed portion adapted to rest on a supporting surface, said cover being formed from a sheet of flexible material having its edge portion folded into a downwardly extending frusto-conical side wall, the material of said cover at the free edge of said wall being preformed into a peripheral bead, and the side wall of said cover immediately above said bead being formed to provide an inwardly opening annular groove within which the edge of said supporting member is received, the depressed portion of said supporting member extending downwardly below said bead.

8. A container, comprising the combination of a supporting member and a cover therefor, said member being circular and having a plane rim portion and within said rim portion a depressed portion adapted to rest on a supporting surface, said cover being formed of flexible material and having a downwardly extending annular side wall, the material of said cover at the edge of said side wall being preformed into a peripheral bead, and the side wall of said cover immediately above said bead being formed to provide an inwardly opening annular groove within which the edge of said supporting member is received, the depressed portion of said supporting member extending downwardly below said bead.

9. A container, comprising the combination of a supporting member and a cover therefor, said member being circular and having a plane rim portion and within said rim portion a depressed portion adapted to rest on a supporting surface, said cover being formed from a sheet of flexible material having its edge portion folded into a downwardly extending frusto-conical side wall with the excess material created by such folding formed into pyramidal flutes, the material of said cover at the free edge of said wall being preformed into a peripheral bead having a normal internal diameter less than the diameter of said supporting member and possesses sufficient elasticity to permit it to be passed over the edge of said supporting member, the depressed portion of said supporting member extending downwardly below said bead when the cover is in place.

CHARLES E. PHILLIPS.